United States Patent [19]

Leu

[11] 4,021,775
[45] May 3, 1977

[54] SIGNAL DEVICE INDICATING DRIVING STATUS OF A CAR

[76] Inventor: Shih-Chin Leu, No. 50-2, Fukien Lane, Tung Hsing Terrace, Changhua Hsien, Erh Lin, China /Taiwan

[22] Filed: Apr. 29, 1976

[21] Appl. No.: 681,470

[52] U.S. Cl. .......................... 340/71; 200/61.45 R; 200/61.89

[51] Int. Cl.² .................. B60Q 1/26; H01H 35/02; H01H 3/14

[58] Field of Search ........................ 340/66, 71, 72; 200/61.89, 61.53, 61.45, 16 R, 51.03, 31

[56] References Cited
UNITED STATES PATENTS

| | | | |
|---|---|---|---|
| 3,375,496 | 3/1968 | Antunovic | 340/72 |
| 3,576,529 | 4/1971 | Garrison | 340/72 |
| 3,676,844 | 7/1972 | Hendrickson | 340/71 |

*Primary Examiner*—Donald J. Yusko
*Attorney, Agent, or Firm*—Burns, Doane, Swecker & Mathis

[57] ABSTRACT

Signal device indicating driving status of a car comprising two series of rear lights with different color and lined up alternatively with each other characterized in that lighting and extinguishing of each series responds to the up/down movement of the accelerator pedal. Connected under the spring biased pedal is a sliding cylinder with a pair of cam means disposed at opposite sides to serve as switch actuators to two rows of switches for signal lights of different colors during respective accelerating and decelerating travels of the pedal. In the sliding cylinder, a normally open gravity switch means is further provided to give an instantaneous warning signal to alert the following car when the pedal is suddenly released for an emergency braking.

5 Claims, 7 Drawing Figures

SIGNAL DEVICE INDICATING DRIVING STATUS OF A CAR

FIELD OF THE INVENTION

The present invention relates generally to a signal device indicating driving status of a car and more particularly to a signal device comprising two series of rear lights of different colors lined up alternatively with each other, lighting and extinguishing of each series responding to the up/down movement of the accelerator pedal, to reflect the car being in accelerating or decelerating condition. A gravity switch is further provided in the device to predict a sudden braking.

BACKGROUND OF INVENTION

A lot of signal lights have now been disposed at the rear of a car each indicating turning direction, braking, etc. However, none has been able to warn a succeeding car of the driving status of the leading car such as accelerating, decelerating, ready to brake, to enable the succeeding car to take precautions to keep a safe distance from the preceeding car to avoid unnecessary accidents. Knowledge of these matters is especially desirable when visibility is poor.

SUMMARY OF INVENTION

Therefore the main object of the present invention is to provide a signal device which will indicate clearly the driving status of a preceeding car and the intention of the driver of the said preceeding car, by two series of signal lights of different color and responding to the movement of the accelerator pedal, to avoid a collision.

Another object of the present invention is to provide a further signal light responding to the sudden release of the accelerator pedal through a gravity switch to predict emergency braking of a preceeding car so that the succeeding car may take precaution to keep at a safe distance from the preceeding car.

Other objects and features of the present invention will become apparent from the following description to be taken in conjunction with the accompanying drawings.

DETAIL DESCRIPTION OF EMBODIMENT

Figure 1:
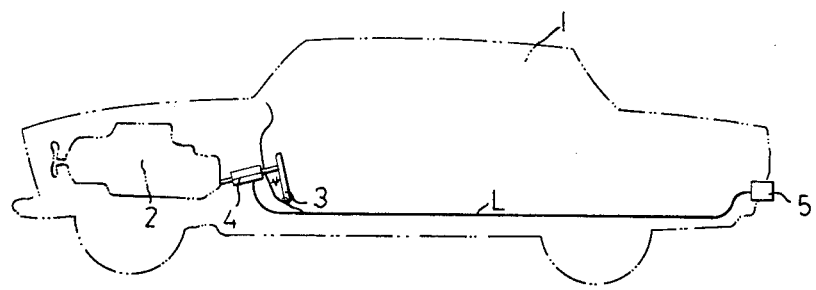
FIG. 1 depicts a schematic diagram showing the layout of the signal device of the present invention in a car.

Now referring to FIG. 1, the switch means 4 of the signal device of the present invention is pivotally associated with the accelerator pedal and mounted near the engine 2 of the car 1, and signal lights 5 of the device are disposed at rear of the car with electric wiring L connected to the switch means 4.

Figure 2:
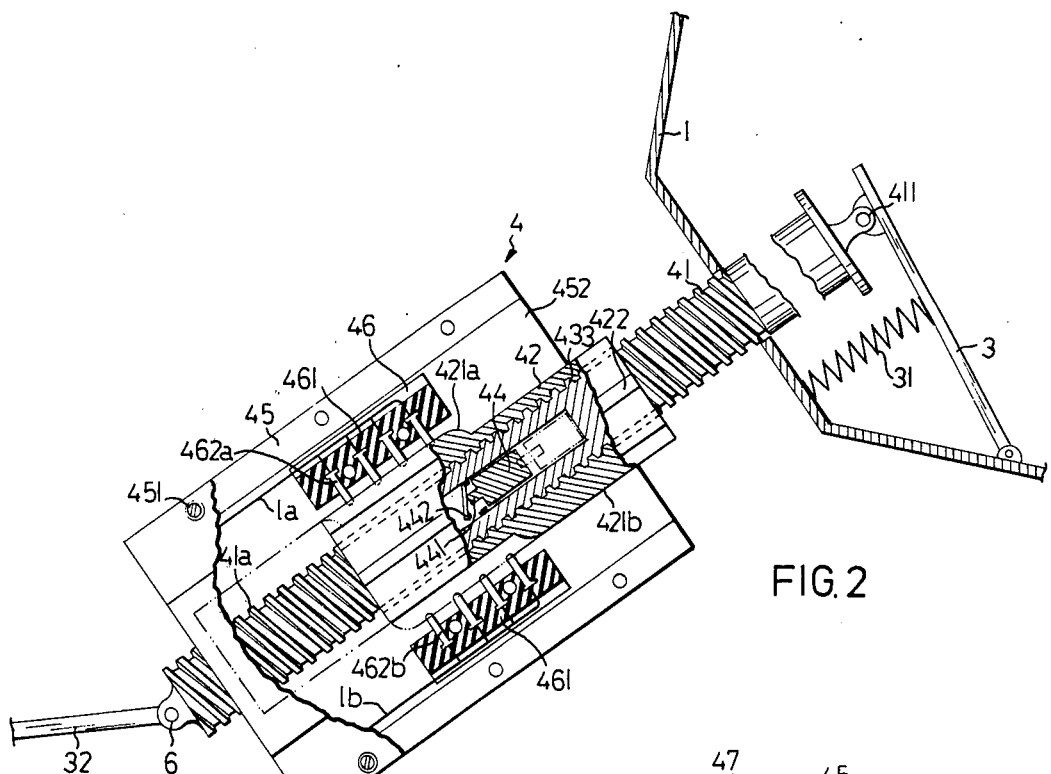
FIG. 2 showing an longitudinal sectional view of a preferred embodiment of the switch means of the signal device of the present invention.
Figure 3:
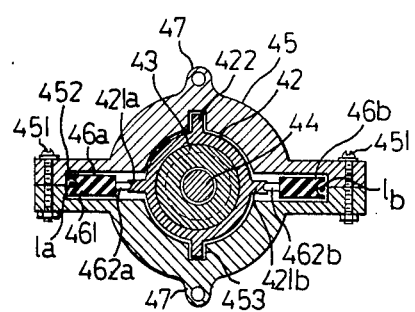
FIG. 3 depicts a cross-sectional view of the switch means of the embodiment in FIG. 2.
Figure 6:
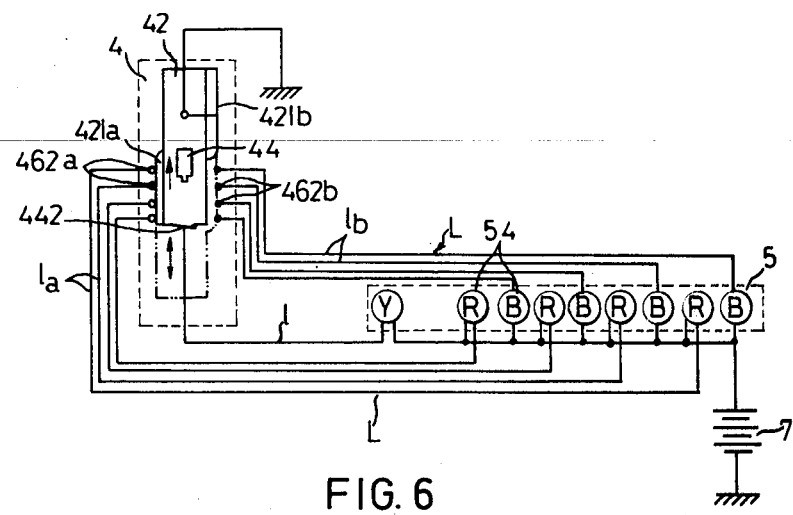
FIG. 6 is a wiring diagram of the signal device of concern.

The details of the switch means 4 may be seen from FIG. 2 and 3. The upper end of a male threaded rod 41 is pivotally connected to the under side of an accelerator pedal 3 through a pin joint 411 the said pedal 3 being biased with a spring 31. The male threaded portion is screwed into a female threaded cylinder 42 so that the relative position between the pedal 3 and switch means 4 may be adjusted. Into the lower end of the female threaded cylinder 42, a further section of male threaded rod 41a is screwed. A swivel eye hole 6 is provided at lower end of rod 41a for the connection of the linkage 32 ordinarily provided to actuate the throttle of carburetor, the threaded rod 41a also enabling adjustment of distance lengthwise. Along the outside wall of cylinder 42, two protruded cam means 421a and 421b are disposed at opposed positions and arranged stepwisely relative to the cylinder; in other words, cam 421a is located somewhat closer to the middle section of cylinder 42 while cam 421b closer to the upper section. Cam means 421a and 421b serve to actuate respectively separate series of switches 462a and 462b embedded in insulation blocks 461 and generally numbered as 46. Switches 462a associated with cam means 421a constitute a part of circuit led out with wire 1a for one series of signal lights R (FIG. 6) and switches 462b associated with cam means 421b constitute a part of circuit led out with wire 1b for another series of signal lights B (FIG. 6). Cylinder 42 and switch blocks 46 are all enclosed in a pair of flanged semi-cylindrical halves 45-45, which are jointed together with bolt and nut 451-451. The casing halves 45-45 have recess 452 to take switch series 46aand 46b. Also grooves 453-453 serve as guides for ribs 422-422 formed at diametrically opposed positions on the outside wall of cylinder 42 and extending all through the length of the cylinder so that the rod 41 may slide freely along inside the casing 45 synchronous with the up/down movement of the pedal 3. Lugs 47-47 are provided outside the casing halves 45-45 for mounting the casing 45 on appropriate part of the chassis of the car.

Inside lower end of rod 41, a cylindrical recess is provided for a weight 44 to be slidable freely therein along the axle direction of the rod 41. The weight piece 44 having a projected lower end 441 and being of insulation material, end 441 keeps a switch means 442 in normal open condition. When there is sudden release of the pedal 3, the weight piece 44 will be lifted with up movement of the rod 41 and let switch 442 close to light a light Y (FIG. 6) through wire 1 to give the warning of emergency braking.

Figure 4:
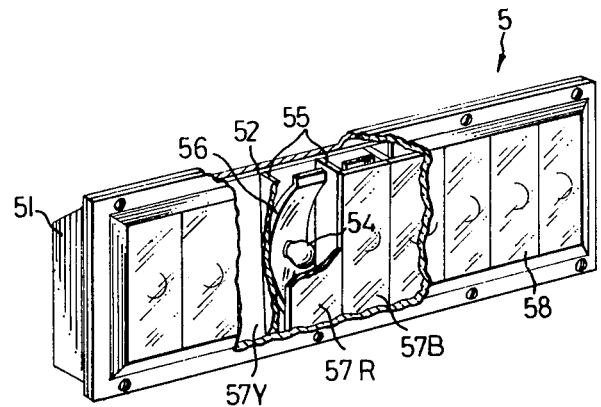
FIG. 4 is a perspective view showing the alternative arrangement of the two series of signal lights with parts cut away to indicate the details.
Figure 5:
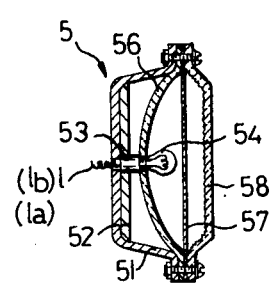
FIG. 5 is a cross-sectional view of the said light in FIG. 4.

In FIGS. 4 and 5, the construction of the series of signal lights 5 is illustrated. The lights are housed in a casing 51 and covered with lens 58. Insulation plate 52 is provided for mounting the lamp socket 53 into which lamp bulb 54 is inserted. Each light is provided with an individual reflector 56, and partition plates 55 are provided between lights. Between reflector 54 and lens 58, transparent color plates 57R (Red), 57B (Blue) and 57Y (Yellow) are placed as required. Red and Blue lights are alternatively arranged and a yellow light is at the end of the row.

FIG. 6 gives the wiring diagram of the present invention which is self-expanatory. Solid lined cylinder 42 showning the up position of the pedal, just the same as shown in FIG. 2, when all red lights are on. Stepping down of the pedal 3, extinguishes the red light one by one while the blue lights go one by one, until the pedal 3 reaches the lower most position, (dotted line position), where all red lights are extinguished and all blue lights on. Upon sudden release of pedal 3 for emergency braking, the yellow light would be on for a time duration equal that of travelling of weight piece 41 being lifted up with the up movement of the cylinder 42 then falling under gravity to resume its original position in the rod 41, with end 441 of weight piece 41 again opening the switch 442. At that time, all red lights come on. The wiring diagram is a single line diagram with another line grounded. Battery 7 is provided herewith to indicate the electricity source.

Figure 7:
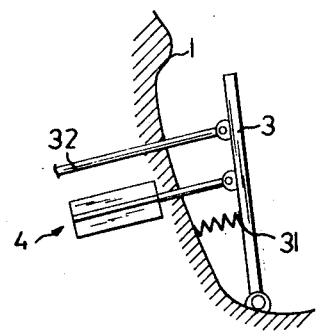
FIG. 7 dipicts a further way to mount the switch means of the said device.

In FIG. 7, the switch means 4 is shown being mounted separately from the linkage 32 provided to actuate the throttle of carburetor, but independently connected under the pedal 3, thus simplified the way of mounting.

The above embodiment is given only for illustration purposes and not by way of limitation and modifications evident to those skilled in the art will fall within the scope of attached claims.

I claim:

1. A signal device for indicating the driving status of a motor vehicle comprising:
    a pair of signal means affixed to said vehicle each having a plurality of different colored lights with the lights of different colors alternately positioned;
    a spring biased accelerator pedal affixed to said vehicle;
    an elongated switch operating member adapted for connection to said pedal and reciprocally movable in response to up and down movement thereof;
    a switch casing mounted on said vehicle and receiving said operating member for reciprocal movement therein;
    two cams disposed on opposite outside walls of said member and longitudinally offset from one another;
    two rows of switches disposed in opposite inside walls of said casing each row of switches aligned with one of said cams and operable in response to a respective one of said cams to control the actuation of the signal lights of one color in sequence as said operating member moves in response to accelerating and decelerating travel of the pedal; and,
    emergency signal means disposed in said member and including gravity operated switch means operable in response to movement of said operating member due to a sudden release of the pedal, and a signal light responsive to the operation of said gravity operated switch.

2. A signal device as recited in claim 1 wherein said operating member is, at least in part, substantially cylindrical and includes outwardly extending longitudinal ribs diposed on the outside wall thereof, wherein the casing includes a pair of flanged, generally semi-cylindrical members joined together at said flanges and having, in the inside walls thereof, recesses for housing said rows of switches and longitudinal grooves for receiving said ribs to serve as guides.

3. A signal device as recited in claim 1 wherein said operating member includes:
    a cylinder with said cams thereon slidable in said casing and having a passage therein with female threads;
    an upper rod section having male threads adjustably threaded in said passage and a pivotal joint for connection to the accelerator pedal; and
    a lower rod section threaded in said passage and having a swivel element for connecton to linkage means operating a carburetor in the vehicle.

4. A signal device according to claim 3 wherein said upper rod section has a cylindrical recess inside and near its lower end and further including:
    a weight piece disposed and freely slideable in said upper rod section recess;
    said weight piece having a projected lower end to keep said gravity operated switch means normally open; and,
    said weight piece lifted with said upper rod upon sudden release of said pedal so as to permit said gravity switch to close and activate a warning light.

5. A signal device as recited in claim 1 wherein said switch operating member is operable from the accelerator pedal independently of any connection between the accelerator pedal and the carburetor of the motor vehicle.

* * * * *